United States Patent
Hall (10) Patent No.: US 6,937,853 B2
(45) Date of Patent: Aug. 30, 2005

(54) MOTION DISPATCH SYSTEM

(76) Inventor: William David Hall, 504 Beacon St. #65, Boston, MA (US) 02115

( * ) Notice: Subject to any disclaimer, the term of this patent is extended or adjusted under 35 U.S.C. 154(b) by 610 days.

(21) Appl. No.: 10/028,900

(22) Filed: Dec. 20, 2001

(65) Prior Publication Data

US 2002/0115430 A1 Aug. 22, 2002

Related U.S. Application Data (60) Provisional application No. 60/257,758, filed on Dec. 21, 2000.

(51) Int. Cl.$^7$ ............................................... H04M 3/42
(52) U.S. Cl. ................. 455/416; 455/414.4; 455/456.3; 379/88.13; 379/88.16
(58) Field of Search ................... 455/416, 414.1–414.4, 455/401.1–401.2, 418–420, 456.1–456.6, 457, 458, 459, 472; 379/88.12–88.18, 88.22–88.25, 88.27–88.28, 207.02–207.03, 207.11–207.12, 210.01; 705/7–9; 701/207, 208, 201, 211, 213, 214, 217, 30; 340/988–990, 994, 995.1, 995.14, 500, 531, 539.1, 539.13, 7.51, 7.52, 825 VG (56) References Cited

U.S. PATENT DOCUMENTS

| | | | | |
|---|---|---|---|---|
| 5,050,077 A | * | 9/1991 | Vincent | 705/8 |
| 5,124,912 A | * | 6/1992 | Hotaling et al. | 705/9 |
| 5,197,000 A | * | 3/1993 | Vincent | 705/8 |
| 5,261,045 A | * | 11/1993 | Scully et al. | 345/751 |
| 5,270,920 A | * | 12/1993 | Pearse et al. | 705/8 |
| 5,289,531 A | * | 2/1994 | Levine | 379/93.23 |
| 5,459,859 A | * | 10/1995 | Senda | 707/10 |
| 5,493,692 A | * | 2/1996 | Theimer et al. | 455/26.1 |
| 5,790,974 A | * | 8/1998 | Tognazzini | 455/456.5 |
| 5,974,406 A | * | 10/1999 | Bisdikian et al. | 707/1 |
| 6,009,398 A | * | 12/1999 | Mueller et al. | 704/275 |
| 6,101,480 A | * | 8/2000 | Conmy et al. | 705/9 |
| 6,104,788 A | * | 8/2000 | Shaffer et al. | 379/93.17 |
| 6,148,261 A | * | 11/2000 | Obradovich et al. | 701/208 |
| 6,370,566 B2 | * | 4/2002 | Discolo et al. | 709/206 |

(Continued)

*Primary Examiner*—Roland G. Foster
(74) *Attorney, Agent, or Firm*—Aliki K. Collins; AKC Patents LLC (57) ABSTRACT

A system that uses real-time information from a variety of sources to coordinate meetings between parties. For example, the system may be deployed to coordinate meetings between customers and representatives of a company that delivers products or services to customers at many, possibly dynamically determined locations. It may also coordinate meetings between independent parties, such as mutual friends traveling to a meeting point to be determined, or realtors from several realty offices and their collective customers on a busy day. The system manages communications between the meeting parties and accounts for the objectives and constraints of each party to generate an efficient schedule for one or both parties. For example, the system accounts for the service provider's fleet logistics, uncertainty in service times and variability of travel times on the road, and it dynamically schedules the fleet of vehicles and the customers' appointment times to realize an efficient operation that is satisfying to the customers. The system may designate the times and/or locations of meetings, which it coordinates through one or more of a variety of communications means. Also, dynamically updated data from a variety of sources may cause the system to reschedule meetings. For example, unexpected road network traffic congestion resulting in delays may cause the system to rearrange meetings scheduled later in the day. The system is capable of handling future uncertainty through the use of schedule time windows and/or meeting regions which become more precise as the schedule uncertainty lessens over time.

31 Claims, 6 Drawing Sheets

U.S. PATENT DOCUMENTS

| | | | |
|---|---|---|---|
| 6,389,454 B1 * | 5/2002 | Ralston et al. | 709/204 |
| 6,392,669 B1 * | 5/2002 | Matoba et al. | 345/751 |
| 6,457,062 B1 * | 9/2002 | Pivowar et al. | 709/248 |
| 6,480,830 B1 * | 11/2002 | Ford et al. | 705/9 |
| 6,484,033 B2 * | 11/2002 | Murray | 455/456.3 |
| 6,529,136 B2 * | 3/2003 | Cao et al. | 340/686.1 |
| 6,529,824 B1 * | 3/2003 | Obradovich et al. | 701/208 |
| 6,647,380 B1 * | 11/2003 | Yotsukura | 707/2 |
| 6,650,902 B1 * | 11/2003 | Richton | 455/456.3 |
| 6,664,976 B2 * | 12/2003 | Lofgren et al. | 345/634 |
| 6,732,080 B1 * | 5/2004 | Blants | 705/9 |
| 6,747,575 B2 * | 6/2004 | Chauvin et al. | 340/932.2 |
| 6,755,530 B1 * | 6/2004 | Loftus et al. | 351/246 |
| 6,785,680 B1 * | 8/2004 | Cragun | 707/10 |
| 2002/0115430 A1 * | 8/2002 | Hall | 455/414 |

* cited by examiner

MOTION DISPATCH SYSTEM

This application claims benefit of application Ser. No. 60/257,758 filed Dec. 21, 2000.

BACKGROUND OF THE INVENTION

The advent of logistically complex businesses that operate fleets of vehicles to provide service to customers at varied locations, the advent of tightly scheduled services provided in-office, and the ever-increasing mobility of the populace create the need for advanced methods and systems for arranging meetings efficiently. Coordination of meetings between two or more parties has always required, at a minimum, that each party communicate his or her available times to the other. Logistics of each party's transportation to the meeting must be considered in the choice of the meeting schedule and location. Some delivery and service companies employ digital dispatch, communicating service instructions and delivery status between the vehicle and a dispatch center over a wireless digital link. Some services provide for dynamic arrangement of meeting locations using voice communications over a telephone or radio.

SUMMARY OF THE INVENTION

Service delivery to customer homes requires the customers to spend hours waiting because of the lack of information concerning the progress of deliveries to other customers. Missed service calls leading to repeat attempts at delivery are common and expensive for both parties.

Systems which employ digital dispatch require significant manual effort. The dispatch center must be staffed with trained dispatchers, and there is no flexibility in the process to accommodate customer scheduling preferences dynamically, nor are there automatic mechanisms to keep the customer informed in real time about estimated time of service. When the meeting involves more than two parties, the communication logistics between parties can result in meeting locations and schedules that are very inefficient. Systems which implement dynamic adjustments of meeting locations and/or schedules also require considerable manual effort. Further, at least one party must be familiar with the geographic area in which the meeting is to take place.

The present invention implements a system that uses real-time information from a variety of sources to coordinate meetings between parties. For example, the system may be deployed to coordinate meetings between customers and representatives of a company that delivers products or services to customers at many, possibly dynamically determined locations. It may also coordinate meetings between independent parties, such as mutual friends traveling to a meeting point to be determined, or realtors from several realty offices and their collective customers on a busy day.

The system manages communications between the meeting parties and accounts for the objectives and constraints of each party to generate an efficient schedule for one or both parties. For example, the system accounts for the service provider's fleet logistics, uncertainty in service times and variability of travel times on the road, and it dynamically schedules the fleet of vehicles and the customers' appointment times to realize an efficient operation that is satisfying to the customers. The system may designate the times and/or locations of meetings, which it coordinates through one or more of a variety of communications means. Also, dynamically updated data from a variety of sources may cause the system to reschedule meetings. For example, unexpected road network traffic congestion resulting in delays may cause the system to rearrange meetings scheduled later in the day. The system is capable of handling future uncertainty through the use of schedule time windows and/or meeting regions which become more precise as the schedule uncertainty lessens over time.

The present invention implements a system for coordinating meetings between parties. Specifically, a database for the system stores meeting data which includes indications of meetings to be held and potential parties that may attend the meetings and the relevant locations of the parties. The data also includes indications of the relevant location of certain parties, such as those who will actually attend the meetings, and their real-time location. A scheduler and a communications system are coupled to the database. The scheduler generates and updates proposed meeting schedules and stores the proposed meeting schedules in the database. The proposed meeting schedules include meeting data, time, location and parties attending based on the meeting data stored in the database. The communication system provides information regarding the meetings to be held and the proposed meeting schedules.

Embodiments of this aspect may include one or more of the following features. The system may include a tracker coupled to the database. The tracker detects real-time, current locations of the certain parties and provides indications of these locations to the database. Data from the meeting participants may enter the database through several means, and data from the database may be communicated to potential meeting participants through several means. Potential meeting participants' objectives may be elicited and used to determine the meeting schedule. Predicted service times and service time probability distributions may be used to estimate the time at which service can be provided.

The following features may also be included. The service time predictions and probability distributions may be used to estimate the time window required to meet service time guarantees. For example, the service provider may want to meet the quoted time window at least 95% of the time. The service descriptions and the time required to perform them may be recorded to improve the statistical models of the service time required. The meeting locations may be measured by navigation systems and recorded in a separate database for later retrieval. Characteristics of the meeting from the database may be recorded along with associated meeting participant communications for statistical analysis and later retrieval. Potential meeting participants may be represented through Boolean logic. Meeting timing and location constraints for a potential meeting participant may be based on direct measurement of time and location preference.

Users with navigation systems, such as GPS (Geographic Position Systems), in communication with the system may specify the meeting participants and their mobility characteristics, and have the system coordinate the meeting location and time based on the participants' abilities to reach each other.

Meeting timing and location constraints for a potential meeting participant are based on other meetings the participant is to attend, for those potential participants for whom the system is coordinating more than one meeting.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1b is a flow chart of a sequence of steps performed to select an operation mode of the motion dispatch system of FIG. 1a.

DETAILED DESCRIPTION OF THE INVENTION

Figure 1A:
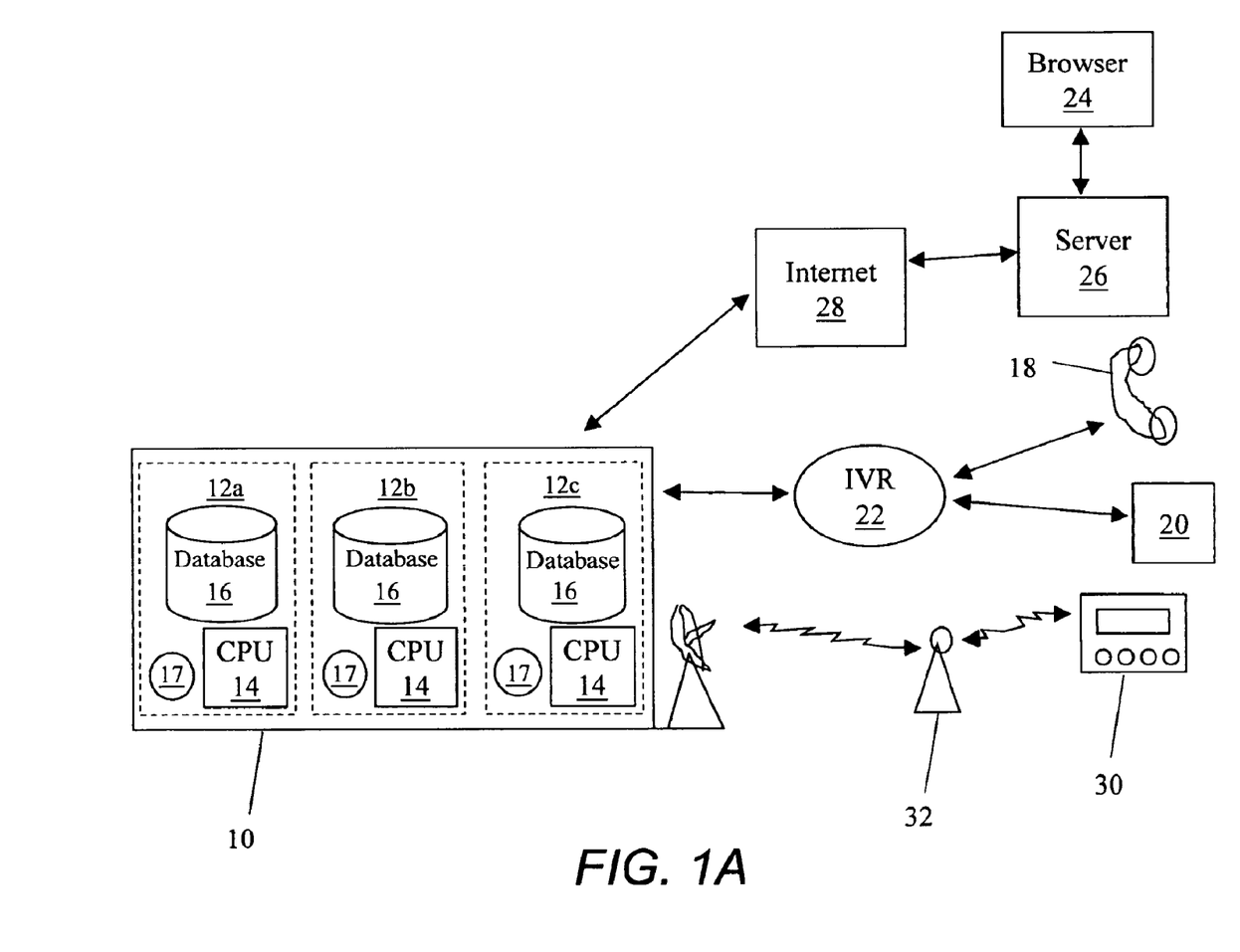
FIG. 1a is a schematic diagram of a motion dispatch system in accordance with the present invention.

Turning attention now to the drawings. FIG. 1a illustrates a motion dispatch system 10 which uses three commercially available computer systems 12a, 12b, and 12c, each having a CPU 14 and a database 16. Each computer system 12a, 12b, 12c also stores a software routine 17 to implement the motion dispatch system 10. The databases 16 store identical information to prevent the catastrophic loss of information in the event that one or two computer systems fail. The system 10 communicates meeting information (time and location) to the participants of the meetings through telephones 18 and paging systems 20 connected to an interactive voice response (IVR) system 22, through browsers 24 of web servers 26 connected to the Internet 28, and through wireless devices 30 (e.g. digital communications text/graphics devices), over cellular communications systems 32, carried on the participants or in the vehicles of the participants. The motion dispatch system 10 uses database software, IVR systems, and custom software written in C, C++, java, and perlscript.

Figure 1B:
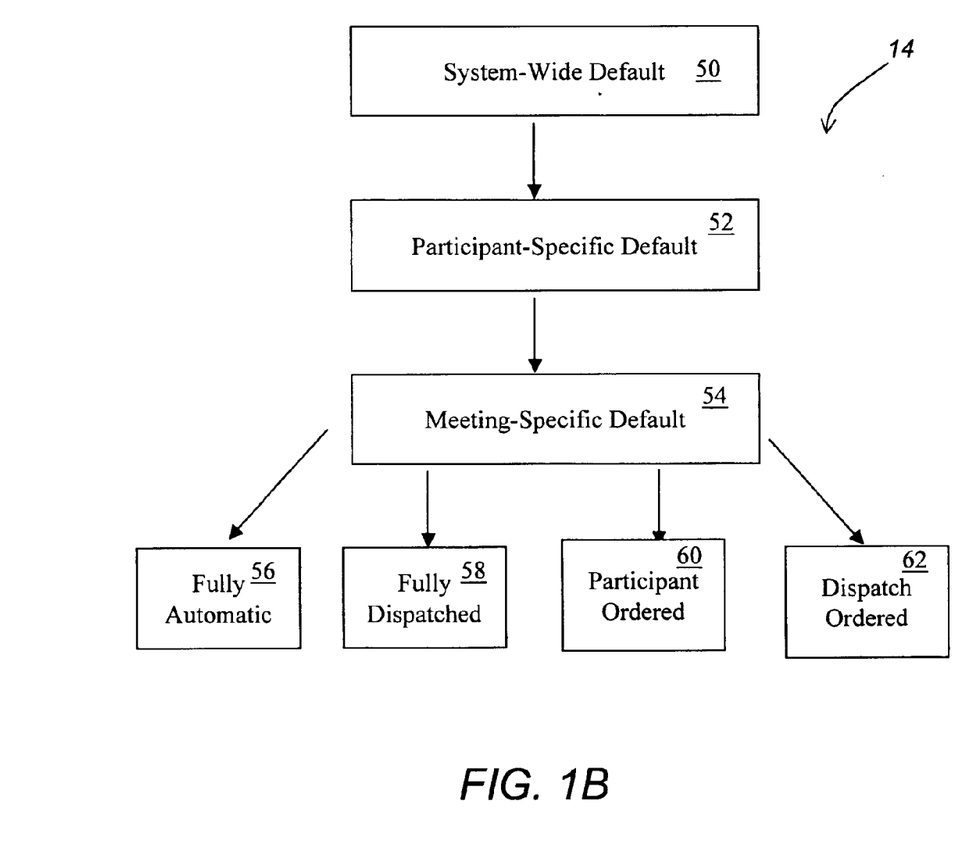

Referring now to FIG. 1b, the system 10 operates in one of four dispatching modes. Specifically, a parameter is set according to a system-wide default 50, which may be over-ridden by a participant-specific default 52, which in turn may be over-ridden by a meeting-specific default 54. The parameter, for any given meeting, takes one of the following values: a fully-automatic mode 56, a fully-dispatched mode 58, a participant-ordered mode 60, or a dispatch-ordered mode 62.

Figure 2:
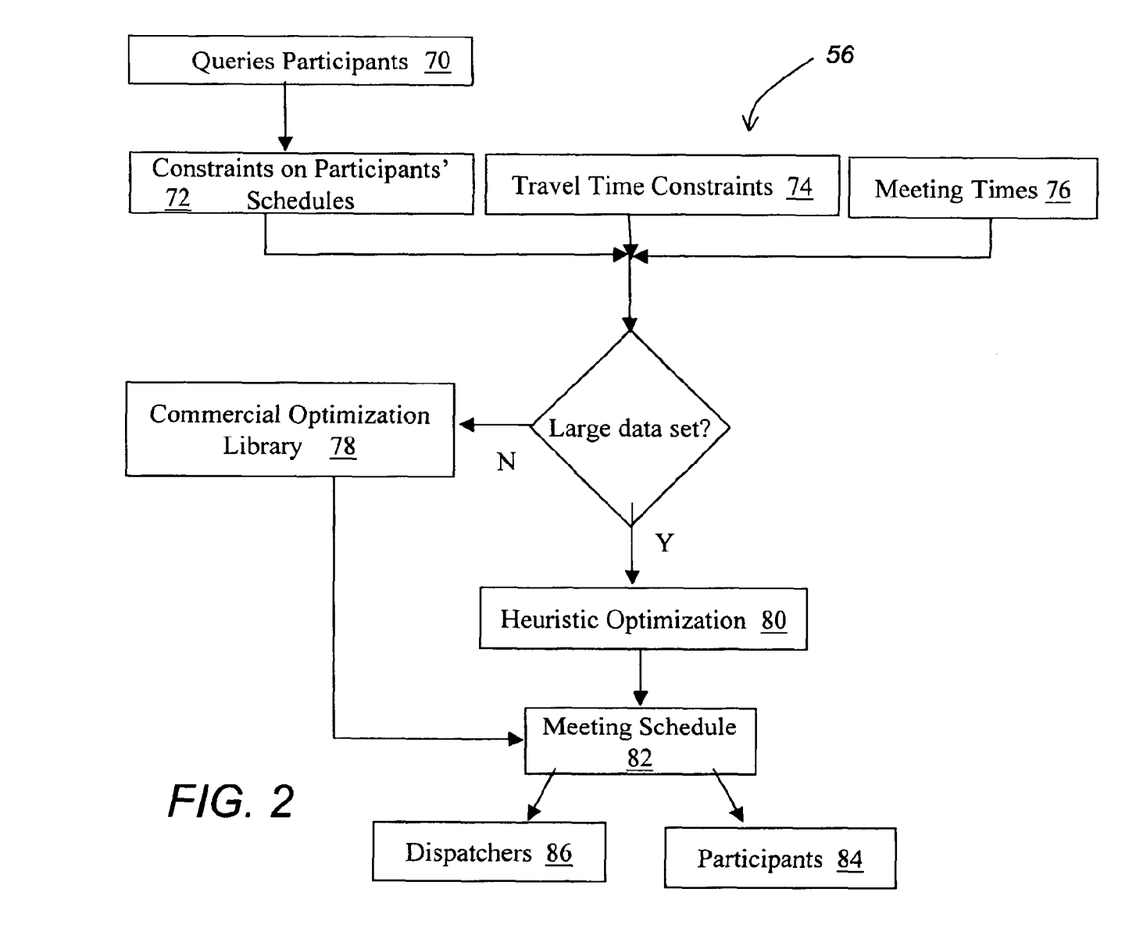
FIG. 2 is a flow chart of a sequence of steps performed when the motion dispatch system of FIG. 1a operates in a fully-automatic mode.

The operation of the fully-automatic mode 56 is depicted in greater detail in FIG. 2. In a first step 70, the system 10 queries each meeting participant for the times that he or she can participate in system-arranged meetings. Next in a step 72, the system converts schedule information into constraints of the form $$x_{ijk} \leq feas_{ijk}, \forall i,j,k \tag{1}$$

$$\sum_{j \in T} x_{ijk} \leq 1, \forall i, k \tag{2}$$

$$\sum_{k \in K} x_{ijk} \leq 1, \forall i, j \tag{3}$$

$$\sum_{i \in I(k)} \sum_{j \in T} x_{ijk} \leq N(k), \forall k \tag{4}$$

$$y_{ik} = \sum_{j \in T} x_{ijk}, \forall i, k \tag{5}$$

$$\sum_{i \in I(k)} y_{ik} \geq R(k), \forall k \tag{6}$$

$$x_{ijk} \in \{0,1\}, \forall i,j,k \tag{7}$$

$$y_{ik} \in \{0,1,2, \ldots \}, \forall i,k \tag{8}$$

Where the $x_{ijk}$ are binary 0–1 variables that represent an assignment of participant i to meeting k at time j when set to 1. Time is discretized into the set T of time periods over which the meetings must take place. K represents the set of meetings under consideration by the system, I(k) is the set of participants who may attend the meeting, N(k) represents the maximum number of meeting participants allowed, and R(k) represents the number of participants required to hold the meeting. Constraints (1)–(8) may be supplemented by the addition of constraints on the $Y_{ik}$ allowing Boolean logic to determine the meeting participants.

Furthermore, in a step 74, travel time constraints are required so that each meeting participant has enough time between meetings to complete the business of each meeting and to travel between them. One approach to incorporate these constraints is to form the matrix A in which element a(k,k') is the time required to complete meeting k and travel to meeting k'. Then the constraints:

$$x_{ijk} + \sum_{j \leq j' \leq j+a(k,k')} x_{ij'k'} \leq 1, \forall i, j, k, k' \tag{9}$$

prevent meetings from being scheduled too close together in time.

Finally, in a step 76 variables $z_{jk}$ are defined to indicate meeting times for use in the objective function:

$$z_{j,k} = \sum_{i} x_{ijk}, \forall j, k \tag{10}$$

that is, $z_{jk}=1$ if meeting k is to occur at time j. These variables allow an objective function of the form $$\max \sum_{j} \sum_{k} v_{jk} z_{jk} \tag{11}$$

which can be adjusted through the objective coefficients $v_{jk}$ to reflect any desired meeting timing and priority objectives.

In a step 78, these constraints and objectives are sent to a commercial optimization library to generate an optimal solution. Alternatively, in a step 80, large sets of data with highly constrained resources are better handled through a mixed heuristic-optimization approach, such as the composite variable formulation applied by Armacost to the optimization of overnight package delivery. (See, Armacost, Andrew P., "COMPOSITE VARIABLE FORMULATIONS FOR NETWORK DESIGN," Ph.D. Thesis in Operations Research, Massachusetts Institute of Technology, June 2000.) In the heuristic-optimization approach, heuristics are used to generate partial meeting schedule candidates. These partial meeting schedule candidates are then pieced together by optimization. Then in a step 82, a schedule solution is generated. The schedules are then relayed to the participants 84 directly, or to the dispatchers 86 who communicate the schedule information to the participants. Communication is though Internet 28/browser 24, IVR 22/phones 18, pagers 20, or wireless systems and channels 32, 30.

In sum, when the motion dispatch system 10 operates in the fully-automatic mode 56, meeting timing, location, and participant constraints are formulated from the appropriate information in the database 16. Objectives are formulated from the meeting times. The resulting optimization problem is solved by standard optimization techniques. Optionally a commercial optimization library may be employed to determine the meeting times and locations. When the motion dispatch system 10 operates in this mode, the system arranges meetings without intervention of a dispatcher.

For meetings that are fully dispatched, the system 10 does not optimize meeting schedules. Rather, as shown in the sequence of steps illustrated in FIG. 3, the system in fully-dispatched mode 58 first queries the participants, in a step 90, as to their schedules, and then displays schedule information to dispatchers in a step 92 subject to travel time constraints 94 and schedule constraints 96. That is, as the dispatchers interact with the system to schedule meetings, the system notifies the dispatchers of any violations of the constraint set (1)–(8) from above caused by the dispatchers' collective schedules. Next, in a step 98, through its communication mechanisms 18, 20, 22, 24, 26, 28, 30 (FIG. 1*a*), the system 10 informs each of the meeting participants of the status, such as location and time of arrival, of other participants coming to the meetings, and of schedule changes by the system.

Figure 3:
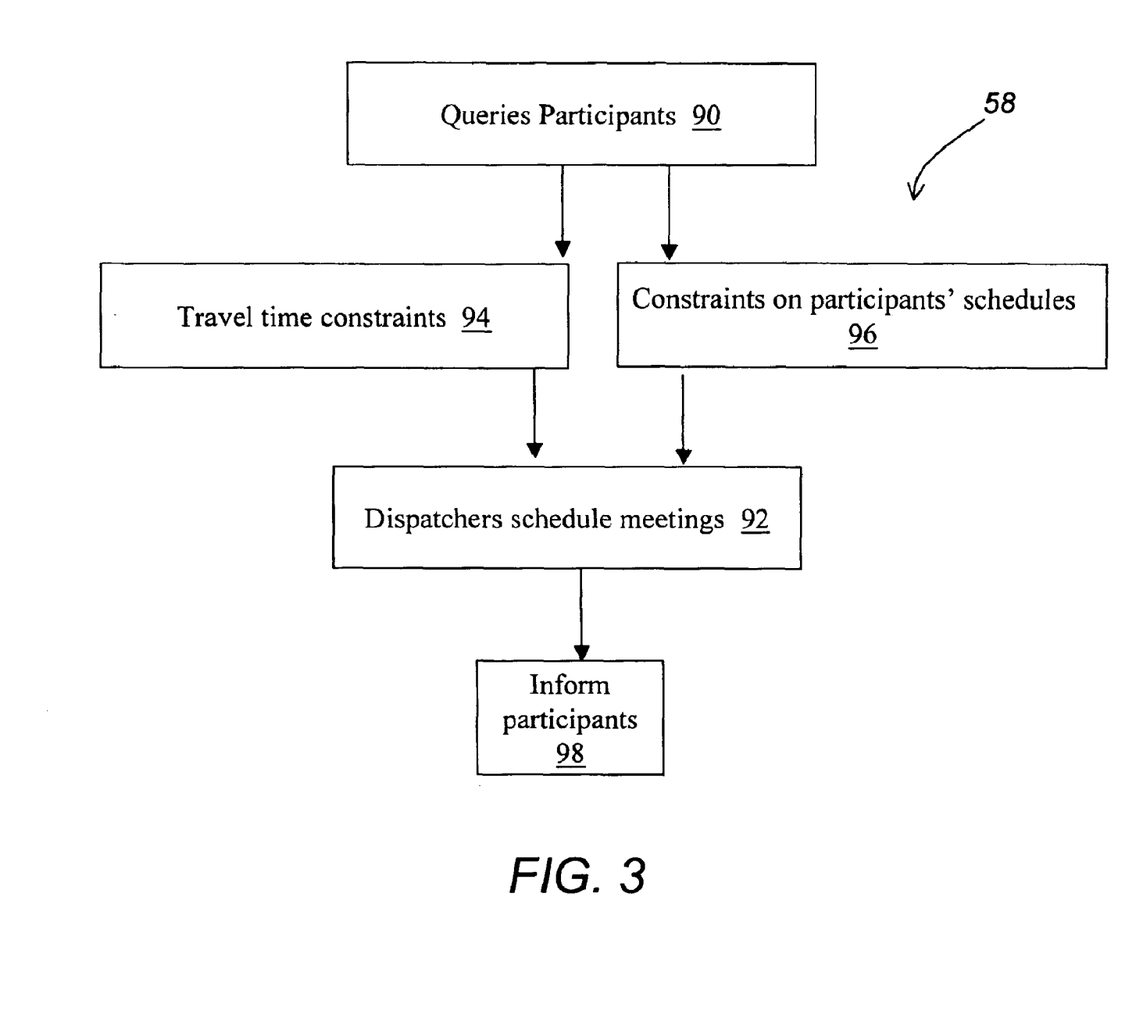
FIG. 3 is a flow chart of a sequence of steps performed when the motion dispatch system of FIG. 1a operates in a fully-dispatched mode.

Note, the meeting participants may communicate service time estimates. If the system 10 determines that it can generate an improved meeting schedule (time and/or location), it communicates the updated schedules to the participants, Schedule changes are implemented only if the probability of success of implementing the new schedule is adequately high. That is, for example, if the net expected benefit of the schedule change is positive as suggested by the following formula:

$$P_s \times \Delta_s > P_F \times C_F$$

where $P_s$ represents the probability of a successful meeting rescheduling, $\Delta_s$ represents the incremental benefit of successfully rescheduling the meeting, represents the probability that the attempt to reschedule cancels the meeting, and $C_F$ represents the cost of canceling the meeting.

Thus when the system 10 operates in the fully-dispatched mode 58, the dispatchers propose the order in which meetings are to occur and the participants of each meeting. Using this information, the system 10 provides estimates of the times at which the meetings are to occur. The dispatchers may then propose a new meeting order. After a satisfactory meeting schedule is generated, the system 10 communicates the implemented schedule to the meeting participants.

Figure 4:
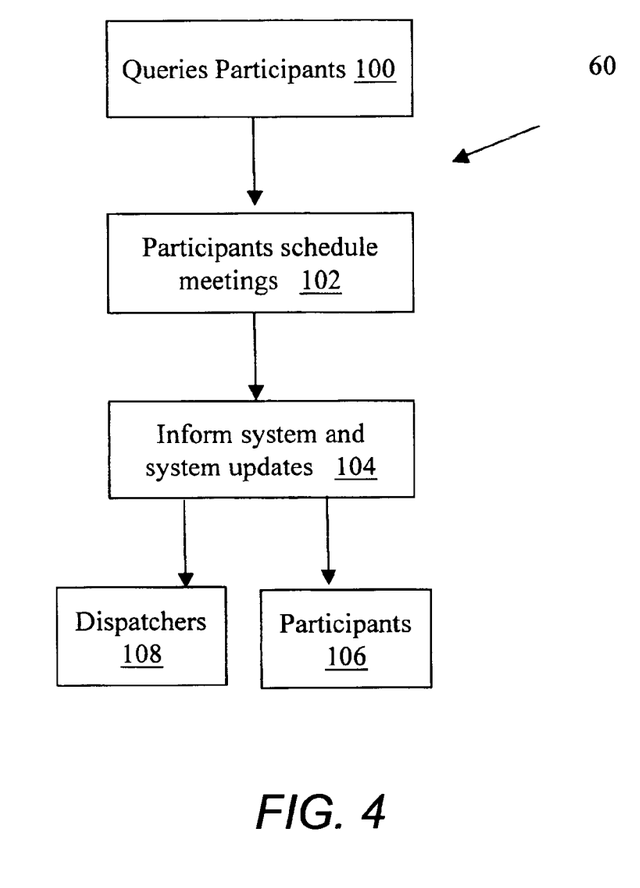
FIG. 4 is a flow chart of a sequence of steps performed when the motion dispatch system of FIG. 1a operates in a participant-ordered mode.

In some circumstances, the participants may want to determine the order of the meetings. Referring to FIG. 4, there is shown a process for scheduling meetings when the system 10 operates in the participant-ordered mode 60. Initially in a step 100 the system 10 queries the participants as to their availability and then assigns meetings to the participants. Then in a step 102, the participants, either collectively or according to participant decision priorities, determine the order of the meetings. Next in a step 104, this meeting order is communicated back to the system through a participant-to-system communication mechanisms (e.g. phone 18 to IVR 22, or browser 24/Internet 28 of FIG. 1*a*). In this step 104, the system 10 updates the meeting schedules. Next, the system 10 communicates the updated meeting schedules to the participants 106 either directly or via the dispatchers 108 through communication mechanisms 18, 20, 22, 24, 26, 28, 30 described in FIG. 1*a*.

In essence, the meeting participants determine the meeting order, and communicates this information to the system 10 so that the system can estimate the times at which meetings would occur. The dispatchers then assign the participants to the meetings. Further, the dispatchers may reassign meetings among the participants or the participants may choose a new order.

Figure 5:
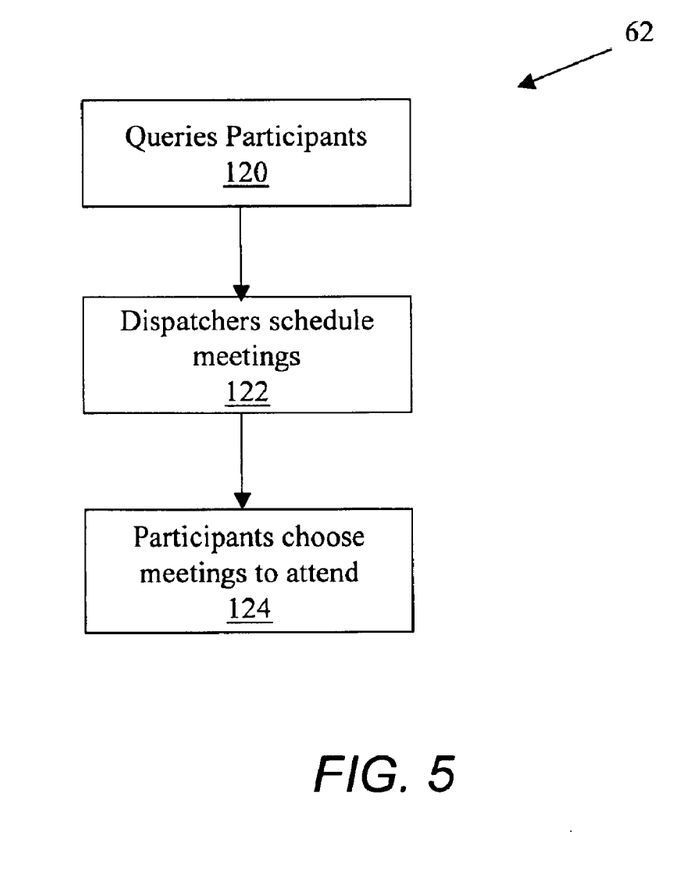
FIG. 5 is a flow chart of a sequence of steps performed when the motion dispatch system of FIG. 1a operates in a dispatched-ordered mode.

In other situations, a dispatcher-ordered process is more desirable. A process to implement the dispatcher-ordered mode 62 is illustrated in FIG. 5. Here, in a step 120, the participants are first queried about their schedules. Next, in a step 122, the meeting order is determined by the dispatchers, and then in a step 124 the participants choose which meetings they can attend. The dispatchers can use this mode 62 to schedule urgent meetings, for instance.

While this invention has been particularly shown and described with references to preferred embodiments thereof, it will be understood by those skilled in the art that various changes in form and details may be made therein without departing from the scope of the invention encompassed by the appended claims.

For example, a tracker (e.g. GPS-based) system of a participant may be in communication with the invention database subsystem 16. As such, real-time geographic location of the participant is indicated in the database 16 and employed by the system 10 in determining and communicating proposed meeting schedules.

Accordingly, video and/or audio and/or digital output is provided from the system 10 to the participants (through at least Internet 28/browser 24 and wireless systems 32, 30 of FIG. 1*a*).

Other tracking means include cellular positioning systems and cell phone locator systems.

What is claimed is:

1. A system for dynamically coordinating meetings, comprising:
    a database storing meeting data including indications of meetings to be held, potential parties that may attend the meetings and relevant locations of the parties, indications of the relevant location of certain parties including real-time current location and a probability distribution of the time required for the parties that may attend more than one meeting to travel between candidate meeting locations;
    a scheduler coupled to the database which generates and updates proposed meeting schedules including meeting date, time, location and parties attending based on the meeting data stored in the database, said scheduler storing proposed meeting schedules in the database; and
    a communications system coupled to the database for providing information regarding the meetings to be held and the proposed meeting schedules.

2. The system of claim 1, further comprising a tracker coupled to the database which detects real-time, current locations of the certain parties and provides indications of the same to the database.

3. The system of claim 2, wherein the communication system enables video display of information stored in the database including at least the real-time current location of the certain parties.

4. The system of claim 3, wherein the communication system includes telecommunication means enabling audio communication of the information stored in the database to the certain parties.

5. The system of claim 2, wherein the tracker detects the location of at least one of the party's vehicle.

6. The system of claim 5, wherein the tracker detects the location of the vehicle through GPS.

7. The system of claim 5, wherein the tracker detects the location of the vehicle through dead reckoning.

8. The system of claim 5, wherein the tracker detects the location of the vehicle through cellular positioning.

9. The system of claim 2, wherein the tracker detects the location of at least one of the party's wireless phone.

10. The system of claim 1, wherein the communication system includes a telecommunication means enabling audio communication of the information stored in the database to at lest one of the parties.

11. The system of claim 10, wherein the communication system enables an interactive voice response system programmed to provide meeting information when called by at least one of the parties.

12. The system of claim 10, wherein the communication system enables an interactive voice response system programmed to call at least one of the parties.

13. The system of claim 1, wherein the communication system includes a multimedia means for providing access to the information stored in the database to at least one of the parties.

14. The system of claim 13, wherein the communication system is programmed to provide meeting information over the Internet.

15. The system of claim 13, wherein the communication system is programmed to provide meeting information over wireless devices.

16. The system of claim 1, wherein the database stores constraints representing the sets of parties that must be present for each meeting to be held.

17. The system of claim 16, wherein the constraints are expressed in Boolean logic.

18. The system of claim 1, wherein the database stores an indication of at least one location at which one of the meetings may be held.

19. The system of claim 1, wherein the database stores at least one time when one of the meeting may be held.

20. The system of claim 1, wherein the database stores a probability distribution of the time required for the parties to travel between potential meeting locations and the locations the parties may be at before and after the meetings.

21. The system of claim 1, wherein the database stores a probability distribution of the time required to hold each meeting.

22. The system of claim 1, wherein the database stores preferences of each party for the feasible times at which meetings may be held.

23. The system of claim 1, wherein the database stores preferences of each party for the feasible meeting locations.

24. The system of claim 1, wherein the database stores at least one proposed schedule of meeting times, locations, and parties.

25. The system of claim 24, wherein the at least one proposed schedule generated by the scheduler is optimized based on the information contained in the database.

26. The system of claim 1, wherein the scheduler functions as an interface between the database and trained dispatch personnel.

27. The system of claim 1, wherein the scheduler includes a communication device to enable at least one of the parties to determine the order of the meetings.

28. The system of claim 1, wherein the scheduler includes a communication device to enable at least one of the parties to determine the meeting schedule.

29. A system for dynamically coordinating meetings, comprising:
   a database storing meeting data including indications of meetings to be held, potential parties that may attend the meetings and relevant locations of the parties, indications of the relevant location of certain parties including real-time current location and a probability distribution of the time required for the parties to travel between potential meeting locations and the locations the parties may be at before and after the meetings;
   a scheduler coupled to the database which generates and updates proposed meeting schedules including meeting date, time, location and parties attending based on the meeting data stored in the database, said scheduler storing proposed meeting schedules in the database; and
   a communications system coupled to the database for providing information regarding the meetings to be held and the proposed meeting schedules.

30. A system for dynamically coordinating meetings, comprising:
   a database storing meeting data including indications of meetings to be held, potential parties that may attend the meetings and relevant locations of the parties, indications of the relevant location of certain parties including real-time current location and a probability distribution of the time required to hold each meeting;
   a scheduler coupled to the database which generates and updates proposed meeting schedules including meeting date, time, location and parties attending baaed on the meeting data stored in the database, said scheduler storing proposed meeting schedules in tho database; and
   a communications system coupled to the database for providing information regarding the meetings to be held and the proposed meeting schedules.

31. The system of claim 24, wherein the at least one proposed schedule generated by the scheduler is optimized based on the objective function of the form of equation 11.

* * * * *